United States Patent
Shah

(10) Patent No.: US 11,118,608 B1
(45) Date of Patent: Sep. 14, 2021

(54) TWIN POPPET MECHANISM OF VALVE POSITIONER WITH PROGRESSIVELY REDUCED LEAKAGE

(71) Applicant: ROTEX Manufacturing and Engineers Private Limited, Mumbai (IN)

(72) Inventor: Amit Shah, Mumbai (IN)

(73) Assignee: ROTEX Manufacturing And Engineering Private Limited, Mumbai (IN)

( * ) Notice: Subject to any disclaimer, the term of this patent is extended or adjusted under 35 U.S.C. 154(b) by 0 days.

(21) Appl. No.: 17/003,074

(22) Filed: Aug. 26, 2020

(30) Foreign Application Priority Data

Jul. 14, 2020 (IN) .............................. 202021029941

(51) Int. Cl.
  *F15B 13/04* (2006.01)
  *F16K 31/126* (2006.01)
  *F16K 11/048* (2006.01)

(52) U.S. Cl.
  CPC ...... *F15B 13/0405* (2013.01); *F16K 31/1262* (2013.01); *F16K 11/048* (2013.01); *Y10T 137/87225* (2015.04)

(58) Field of Classification Search
  CPC ................ Y10T 137/86686; Y10T 137/87225
  See application file for complete search history.

(56) References Cited

U.S. PATENT DOCUMENTS

| | | | | | |
|---|---|---|---|---|---|
| 2,216,925 | A | * | 10/1940 | Schofield | F16K 11/048 137/636.1 |
| 2,777,286 | A | * | 1/1957 | Badalini | F16H 39/14 60/488 |
| 2,961,162 | A | * | 11/1960 | Thorburn | G05D 23/185 236/1 C |
| 3,232,311 | A | * | 2/1966 | Doolittle | B60T 15/043 137/271 |
| 3,242,945 | A | * | 3/1966 | Nash | F16K 31/105 137/596.17 |
| 3,530,886 | A | * | 9/1970 | Zoya | F15B 13/0405 137/867 |
| 3,934,610 | A | * | 1/1976 | Solie | F15B 13/04 137/596.12 |
| 3,967,646 | A | * | 7/1976 | Solie | F15B 13/04 137/596.12 |

(Continued)

*Primary Examiner* — Robert K Arundale

(57) ABSTRACT

Twin poppet mechanism (100) of a valve positioner (101) with progressively reduced leakage, comprising a poppet valve assembly (150) comprising a swivel assembly (110) and a pair of poppet valve assembly (150), a poppet assembly (320) of the poppet valve assembly (150) has a conical tilting freedom (103) around its axis of assembly (151), in a first stable state, the swivel assembly (110) tilts towards a first side (104A) and a rubbing or a lapping action is caused between the first sealing surface (241) and the outer sealing surface (332), and between an inner sealing surface (352) of the poppet body two (350) and the chamber sealing surface (316) of the guide chamber (301), in a second stable state, the swivel assembly (110) tilts towards a second side (104B) and the lapping action is caused between the second sealing surface (261) and the outer sealing surface (332), and between the inner sealing surface (352) of the poppet body two (350) and the chamber sealing surface (316) of the guide chamber (301).

6 Claims, 23 Drawing Sheets

(56) References Cited

U.S. PATENT DOCUMENTS

| | | | | |
|---|---|---|---|---|
| 3,972,347 | A | * | 8/1976 | Perkins .................. F25B 13/00 137/596.18 |
| 4,640,309 | A | * | 2/1987 | Hoffman ............. F15B 13/0405 137/596.14 |
| 4,662,399 | A | * | 5/1987 | Buchner ............... F16K 11/022 137/625.17 |
| 5,454,400 | A | * | 10/1995 | Rodgers ................ F15B 13/042 137/454.6 |
| 6,062,260 | A | * | 5/2000 | Yoshimura .......... F15B 13/0405 137/596.14 |
| 6,145,541 | A | * | 11/2000 | Hirota .................. F16K 11/044 137/627.5 |
| 2009/0283164 | A1 | * | 11/2009 | Cho .................... F04B 27/1804 137/624.27 |

* cited by examiner

TWIN POPPET MECHANISM OF VALVE POSITIONER WITH PROGRESSIVELY REDUCED LEAKAGE

FIELD OF THE INVENTION

The present invention relates to flow control valve positioner, and particularly to poppet mechanism deployed therein. More particularly, the present invention relates to a twin poppet mechanism with progressively improved performance as it operates.

BACKGROUND OF THE INVENTION

Fluid flow control valves, simply referred as valves hereinafter, are a well-established electromechanical device, used in almost every process industry. Various types of valves such as globe control, ball valve, butterfly valve, diaphragm valve are known.

Control valves are normally fitted with valve actuators along with intelligent positioners. U.S. Pat. Nos. 4,072,087 and 5,848,609 disclose digital valve positioner amongst several other.

Use of poppet mechanism in valve and positioner is known well. U.S. Pat. Nos. 4,665,943, 5,337,783, US20110139254A1 disclose poppet valves and various improvisations.

Poppet mechanism, like most other mechanisms have ageing and wearing related performance deteriorations, fluid leakage being most prominent. So much so that the industry is accustomed to a gradual deterioration.

The present invention breaks this limitation.

OBJECTIVES

The objective is to invent a poppet mechanism that has progressively reduced fluid leakage while in operation.

Another objective is to invent a poppet mechanism that has minimum components.

SUMMARY OF INVENTION

The present invention is a twin poppet mechanism comprising a swivel assembly and a pair of poppet valve assembly. In the preferred embodiment, the twin poppet mechanism resides in a positioner.

The swivel assembly comprises a swivel bridge, a firm valve cap, a ratcheted valve cap with a spring, and a locking means. The firm cap has a first sealing surface. The ratcheted valve cap has a second sealing surface and a toothed periphery. The firm cap is rigidly disposed while the ratchet cap is rotatably disposed and is spring loaded.

The poppet valve assembly comprises a guide chamber assembly and a poppet assembly. The guide chamber assembly has a guide chamber and a plurality of 'O' rings. The guide chamber has a chamber sealing surface. There is a first opening and a second opening of the guide chamber. There is a plurality of first port openings along with a corresponding first port flow path, and a plurality of second port openings along with a corresponding second port flow path, on and around the cylindrical wall. The poppet assembly has a poppet body one, a poppet body two, a diaphragm and a spring.

The poppet body one has an outer sealing surface. The poppet body two has an inner sealing surface.

A swivel stroke length of the swivel assembly which implies an orthogonal travel between extreme positions, that ensures a required gap between the first sealing surface of the firm cap and the second sealing surface of the ratcheted valve cap with the outer sealing surface of the poppet body one of respective poppet assembly is adjustable by the engager engaging with the tooth periphery of the ratcheted valve cap at an appropriate tooth, arrived by rotatably adjusting the ratcheted cap valve. An axial thrust by the spring prevents unwanted movement of the ratcheted valve cap.

The poppet assembly of the poppet valve assembly has a conical tilting freedom around its axis of assembly.

In a first stable state, the swivel assembly tilts towards a first side of the positioner such that the first sealing surface of the firm cap presses against the outer sealing surface of the poppet body one of the associated poppet valve assembly causing a rubbing or a lapping action on the outer sealing surface while the swivel assembly tilts. The lapping action also simultaneously happens between the inner sealing surface of the poppet body two and the chamber sealing surface of the guide chamber. In this first stable state, an inlet port and an outlet port are connected while the exhaust flow path is blocked. A reverse lapping action happens when the pre-state valve governs release from the first stable state.

In a second stable state, the swivel assembly tilts towards a second side of the positioner such that the second sealing surface of the ratcheted valve cap presses against the outer sealing surface of the poppet body one of the associated poppet valve assembly causing a rubbing or a lapping action on the outer sealing surface while the swivel assembly tilts. The lapping action also simultaneously happens between the inner sealing surface of the poppet body two and the chamber sealing surface of the guide chamber. In this second stable state, an inlet port and an outlet port are connected while the exhaust flow path is blocked. A reverse lapping action happens when the pre-state valve governs release from the second stable state.

In the middle stable state, the inlet ports and outlet ports remain disconnected while the exhaust flow path of the respective poppet valve assemblies gets connected to the corresponding outlet ports.

Each lapping action may result into micro particles detached from the corresponding sealing surface. Such particles are carried away and out of the poppet valve assembly through the exhaust flow path by a blowout current consequent to valve operations. The essence and the inventiveness of the present invention of the twin mechanism is a recurring "lapping—stable state—blow out" action during operation of the valves wherein each operation causes lapping action, consequently improving mutual sealings, namely mutual sealing between the first sealing surface and the outer sealing surface, between the second sealing surface and the outer sealing surface, between the inner sealing surfaces and the corresponding chamber sealing surface, and thus progressively reducing fluid leakage.

The preferred embodiment is described in relation to a pair of poppet valves and in conjunction with a swiveling operation; however, the present invention is equally applyable to a single poppet valve or multiple poppet valves. Poppet valve body may be made in two parts for ease of production and trapping of diaphragm.

BRIEF DESCRIPTION OF DRAWINGS

FIG. 2A is a sectional front view of a positioner with core constituents of the present invention, while

FIG. 3A is a perspective view of constituents of a swivel assembly while

FIG. 9 is a perspective view of a guide chamber while

DETAILED DESCRIPTION OF INVENTION

The present invention shall now be described with the help of accompanying drawings. It is to be expressly understood that the present invention can be worked with several variations and the embodiment described should not be construed to limit the invention in any manner whatsoever.

The present invention is a twin poppet mechanism. As a preferred embodiment, the twin poppet mechanism is described for a positioner, however the application is not limited thereto and the present invention is applicable to a single poppet valve, or multiple valves, in any application or as a stand-alone.

Figure 1:
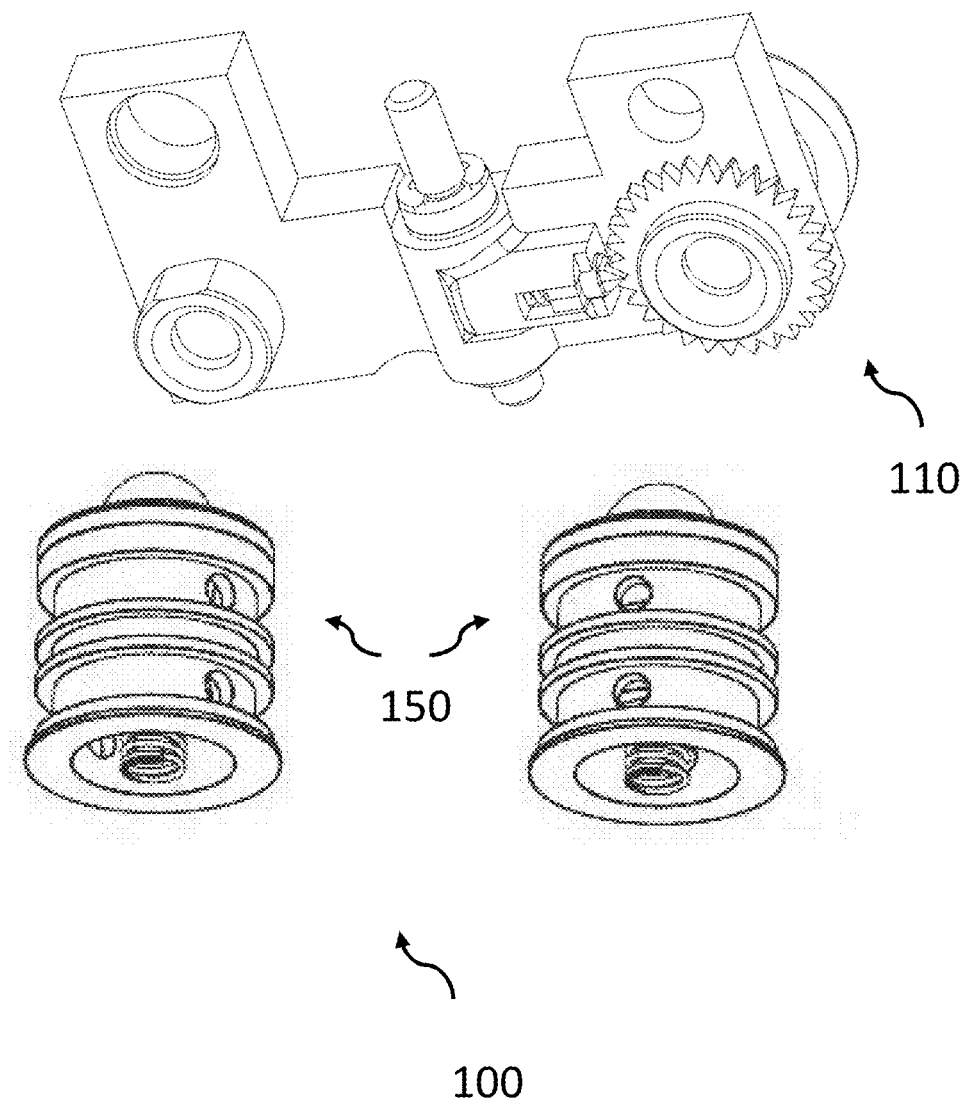
FIG. 1 is a perspective view of core constituents of the present invention.
Figure 2A:
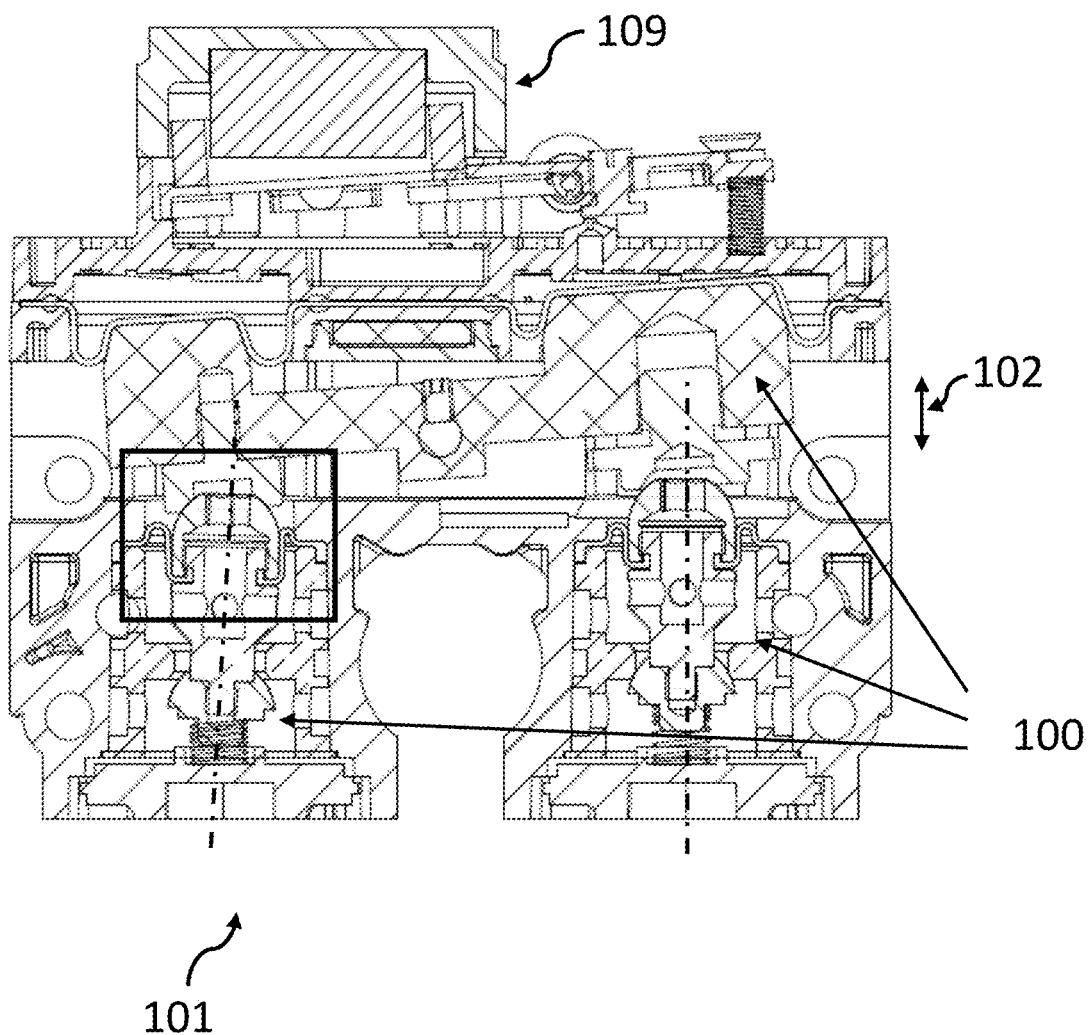
Figure 2B:
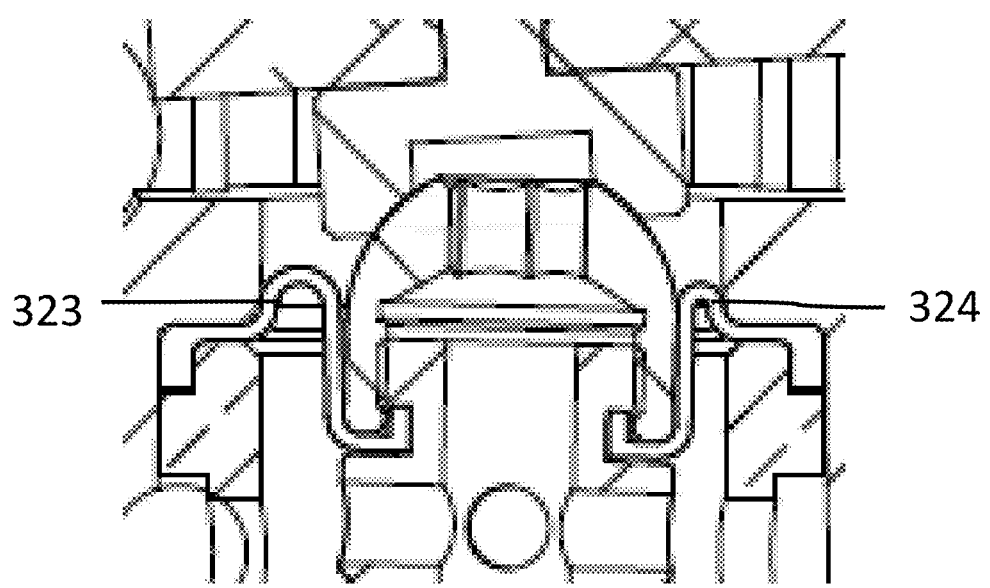
FIG. 2B is a magnified view of a boxed portion of FIG. 2A.

FIG. 1, the twin poppet mechanism (100) comprises a swivel assembly (110) and a pair of poppet valve assembly (150). In the preferred embodiment, the twin poppet mechanism (100) resides in a positioner (101). FIG. 2.

Figure 3A:
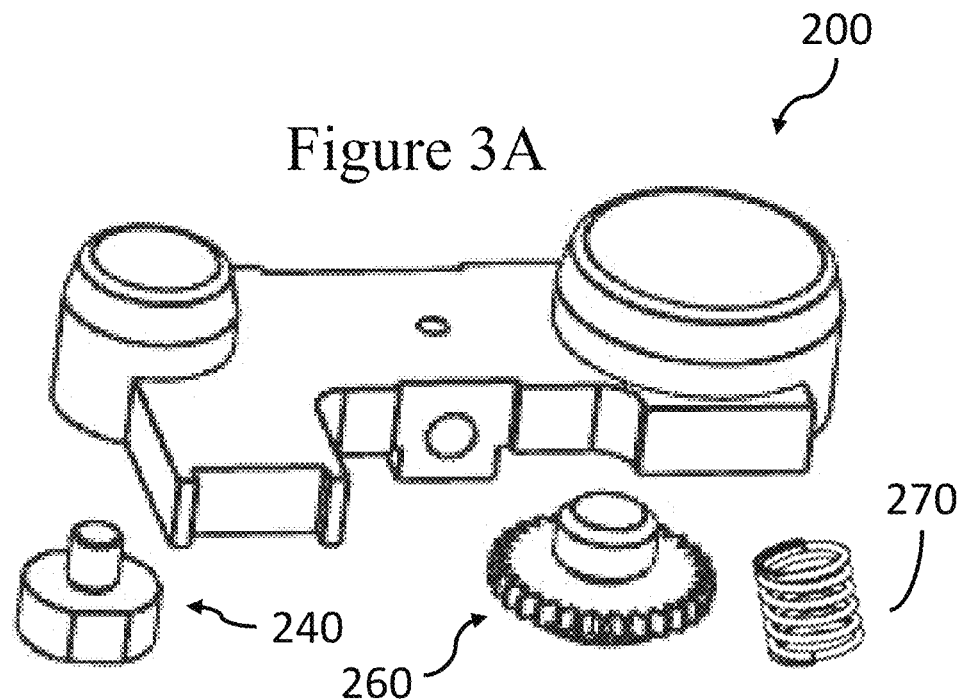
Figure 3B:
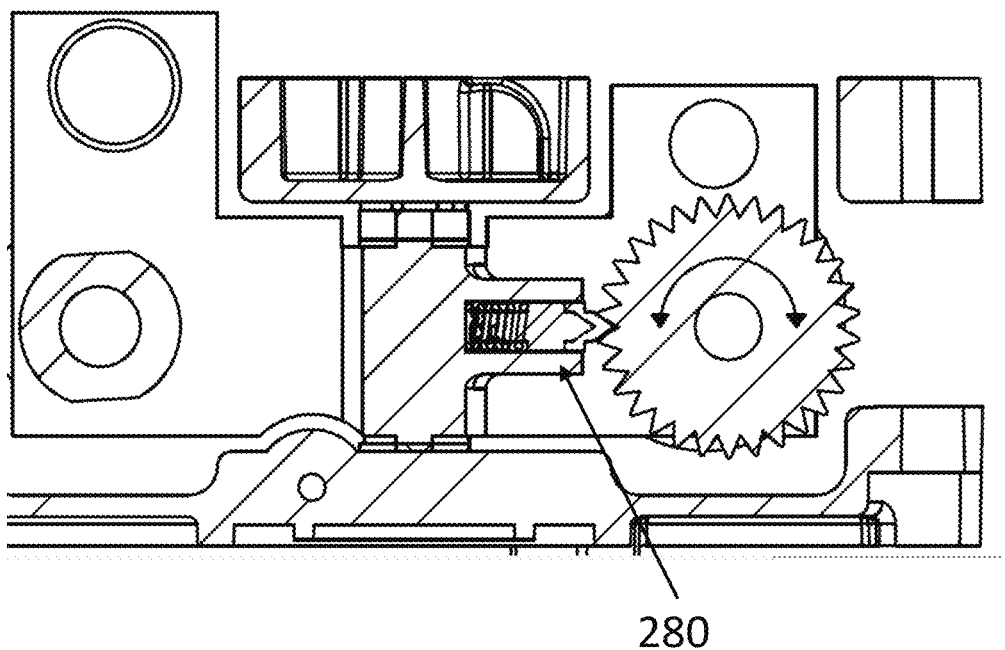
FIG. 3B is a sectional bottom view of the swivel assembly.

FIGS. 3A and 3B, the swivel assembly (110) comprises a swivel bridge (200), a firm valve cap (240), a ratcheted valve cap (260) with a spring (270), and a locking means (280).

Figure 4:
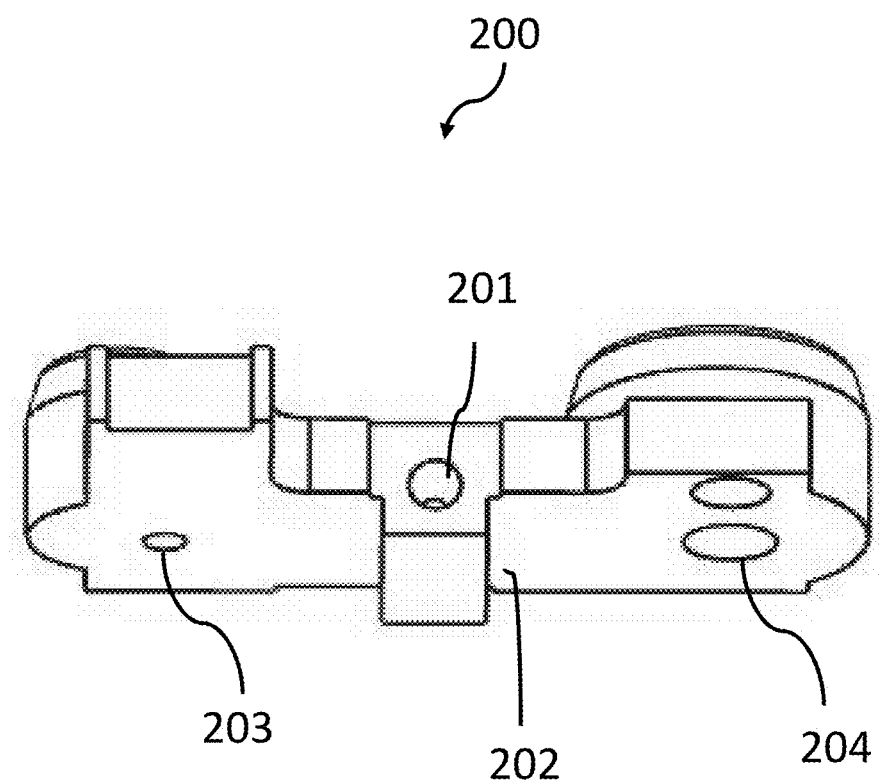
FIG. 4 is a perspective view of a swivel bridge.

FIG. 4, the swivel bridge (200) has a hinging passage (201), a holding provision (202) for disposing the locking means (280), a first cap mounting provision (203) and a second cap mounting provision (204).

Figure 5:
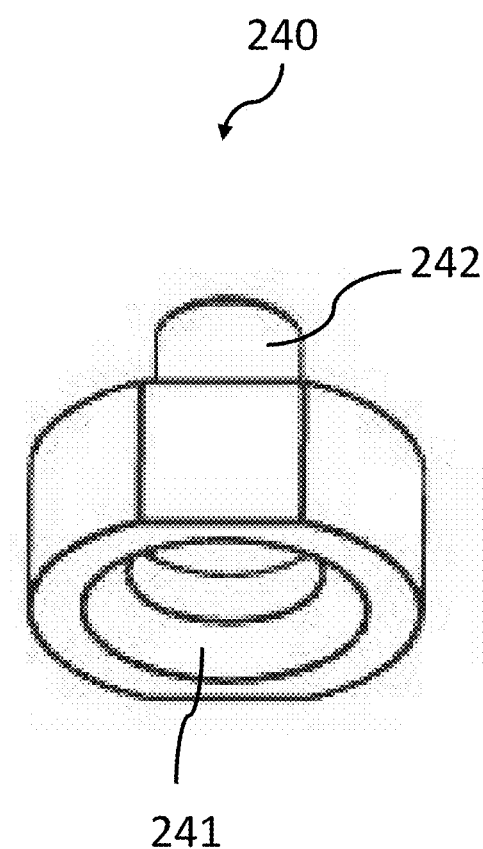
FIG. 5 is a perspective view of a firm valve cap.

FIG. 5, the firm cap (240) has a first sealing surface (241) and a cap fixation provision (242).

Figure 6:
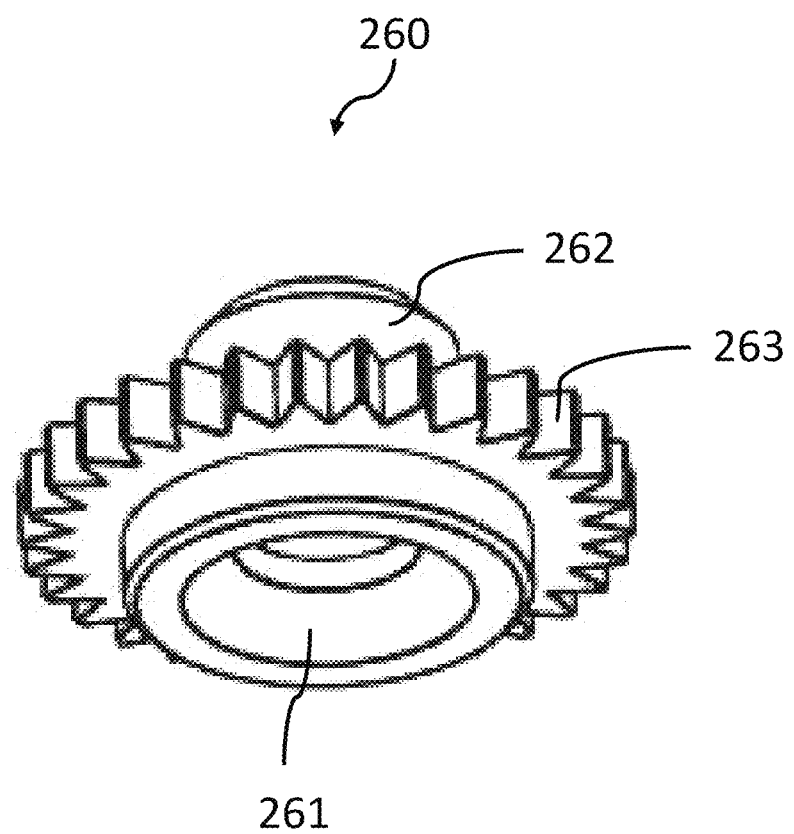
FIG. 6 is a perspective view of a ratcheted valve cap.

FIG. 6, the ratcheted valve cap (260) has a second sealing surface (261), a ratchet fixation provision (262), and a toothed periphery (263).

Figure 7:
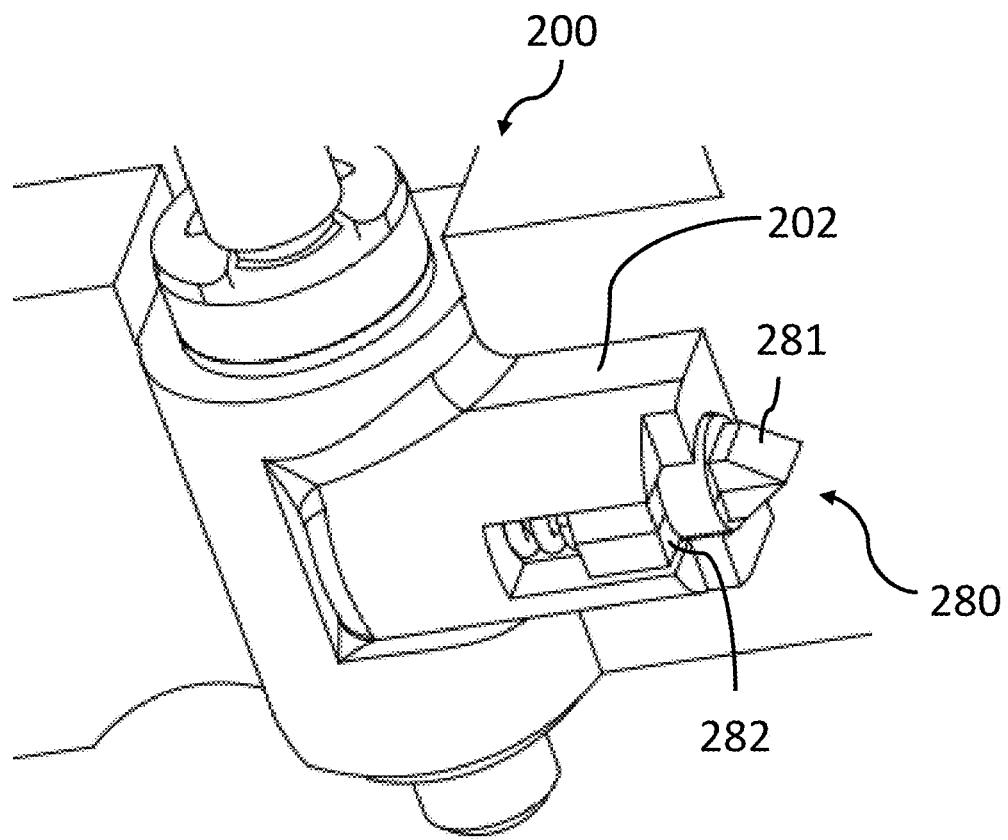
FIG. 7 is a sectional view of a locking means.

FIG. 7, the locking means (280) comprises an engager (281). The engager (281) has a defeat provision (282) and is spring assisted.

The firm cap (240) is rigidly disposed in the first cap mounting provision (203), while the ratchet cap (260) is rotatably disposed in the second cap mounting provision (204).

Figure 8:
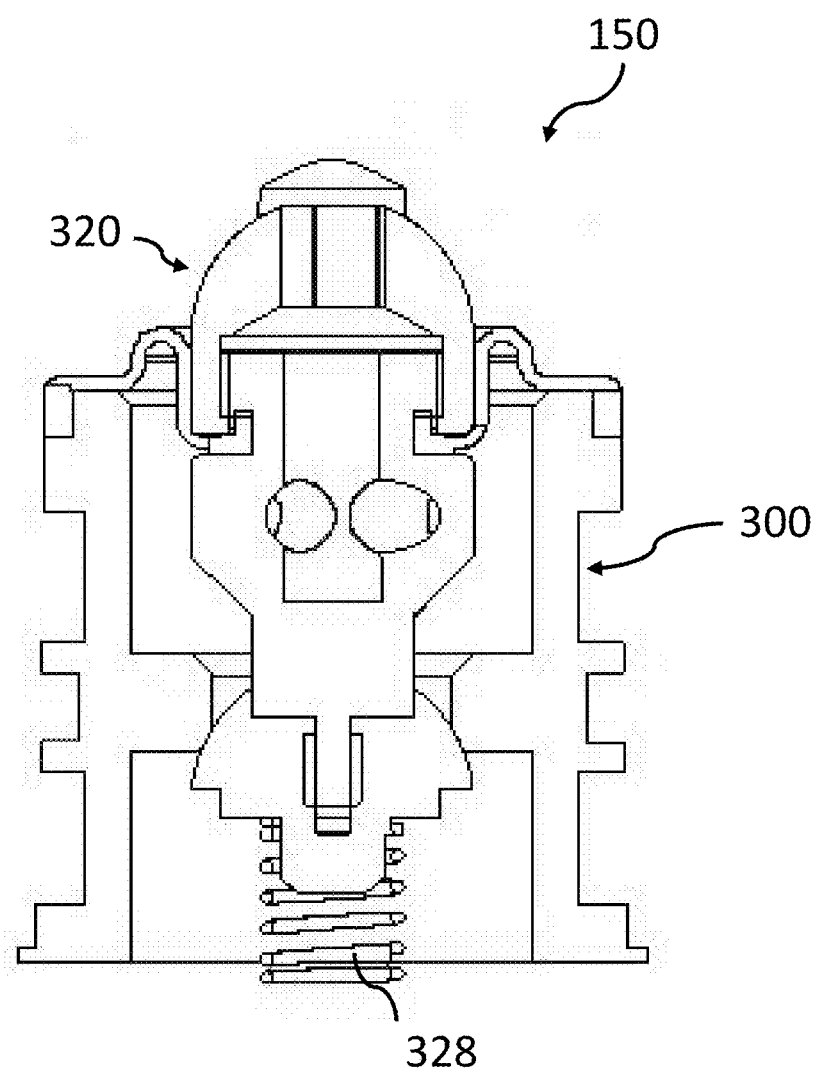
FIG. 8 is a sectional view of a poppet valve assembly.

FIG. 8, the poppet valve assembly (150) comprises a guide chamber assembly (300) and a poppet assembly (320).

Figure 9:
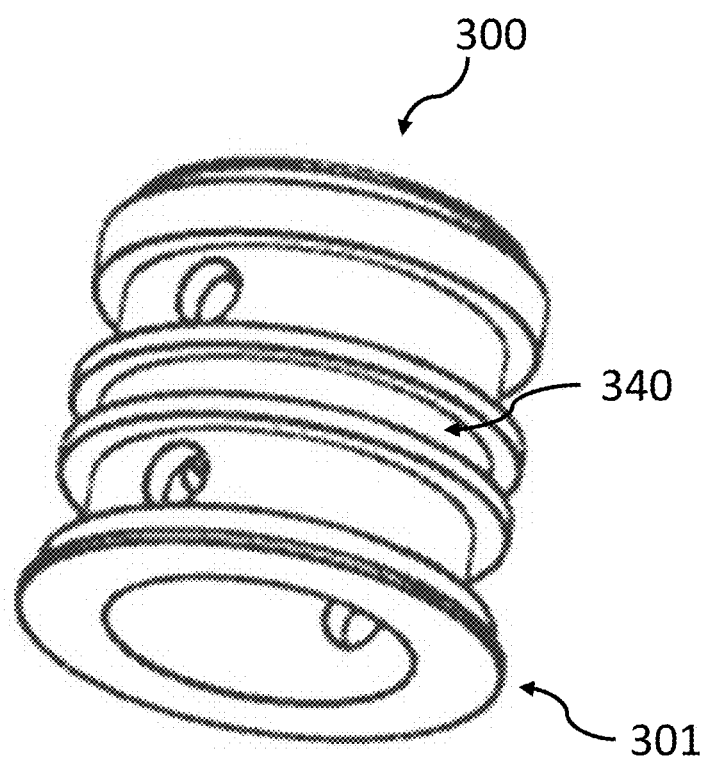

FIG. 9, the guide chamber assembly (300) has a guide chamber (301) and a plurality of 'O" rings (340).

Figure 10:
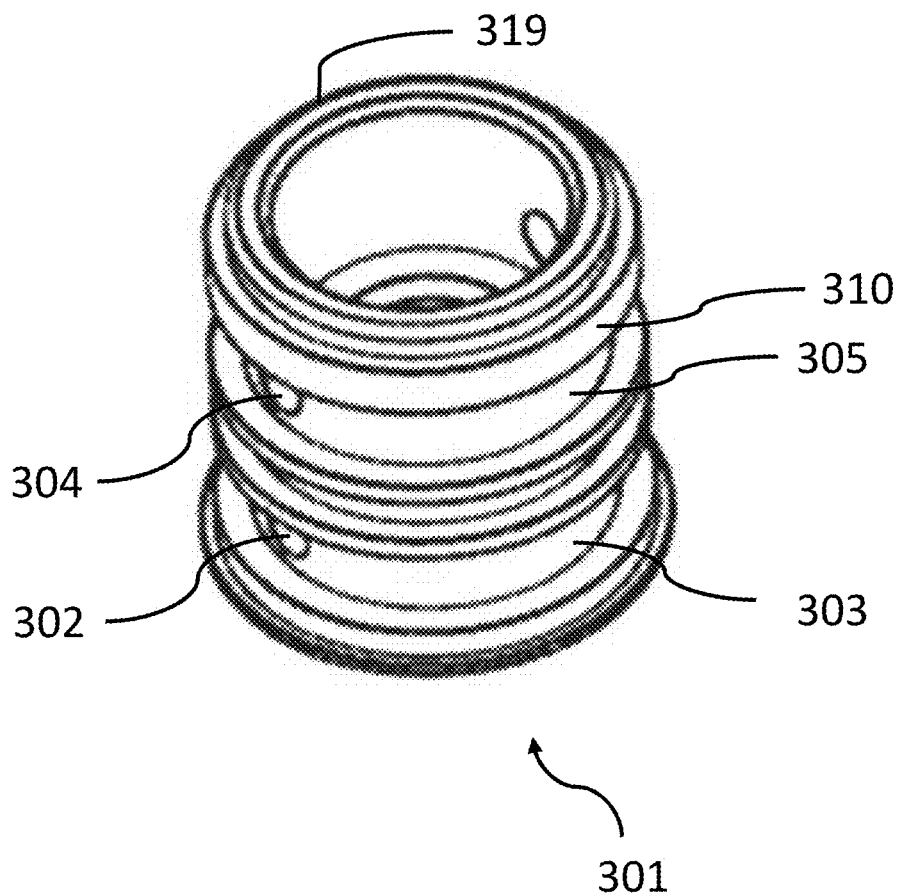
FIG. 10 is another perspective view.
Figure 11:
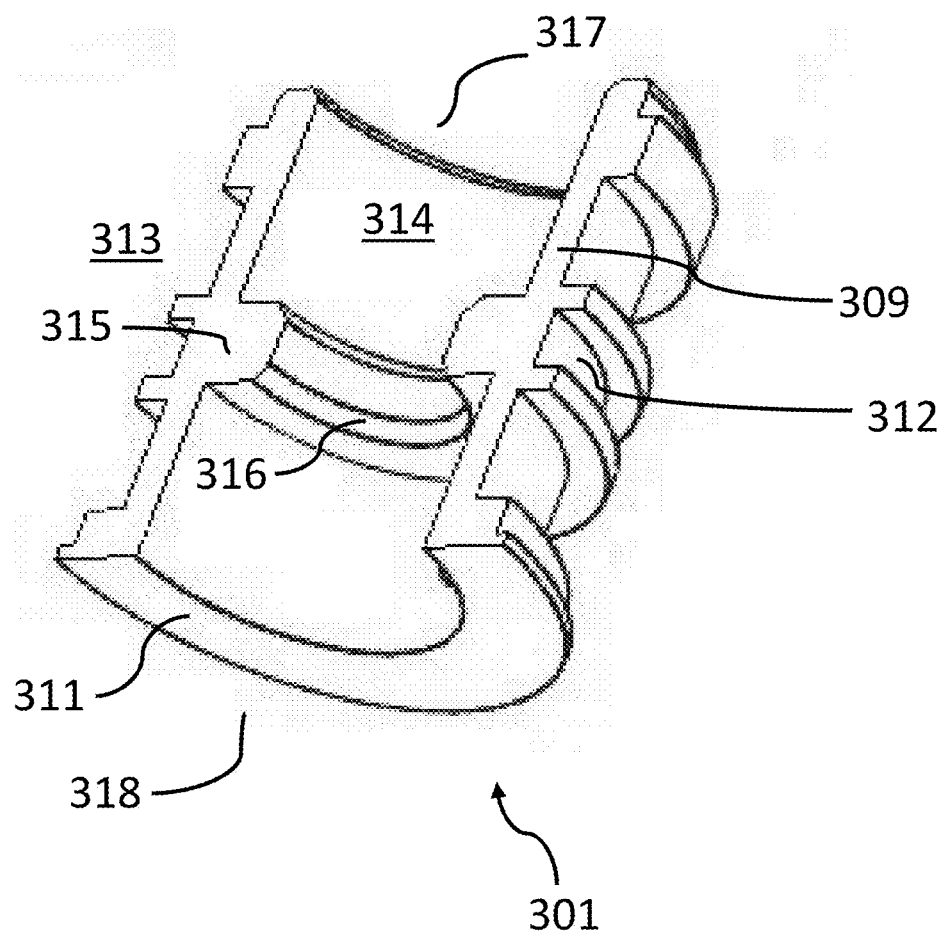
FIG. 11 is a section view of the guide chamber.

FIG. 10, 11, the guide chamber (301) has a cylindrical wall (309), a support ring (319), a plurality of guide rings (310), at least one stopper ring (311), and at least a 'O' ring groove (312) on an outside (313). On an inside (314), the guide chamber (301) has a blocking ring (315) having a chamber sealing surface (316). There is a first opening (317) and a second opening (318) of the guide chamber (301). There is a plurality of first port openings (302) along with a corresponding first port flow path (303), and a plurality of second port openings (304) along with a corresponding second port flow path (305), on and around the cylindrical wall (309).

Figure 12:
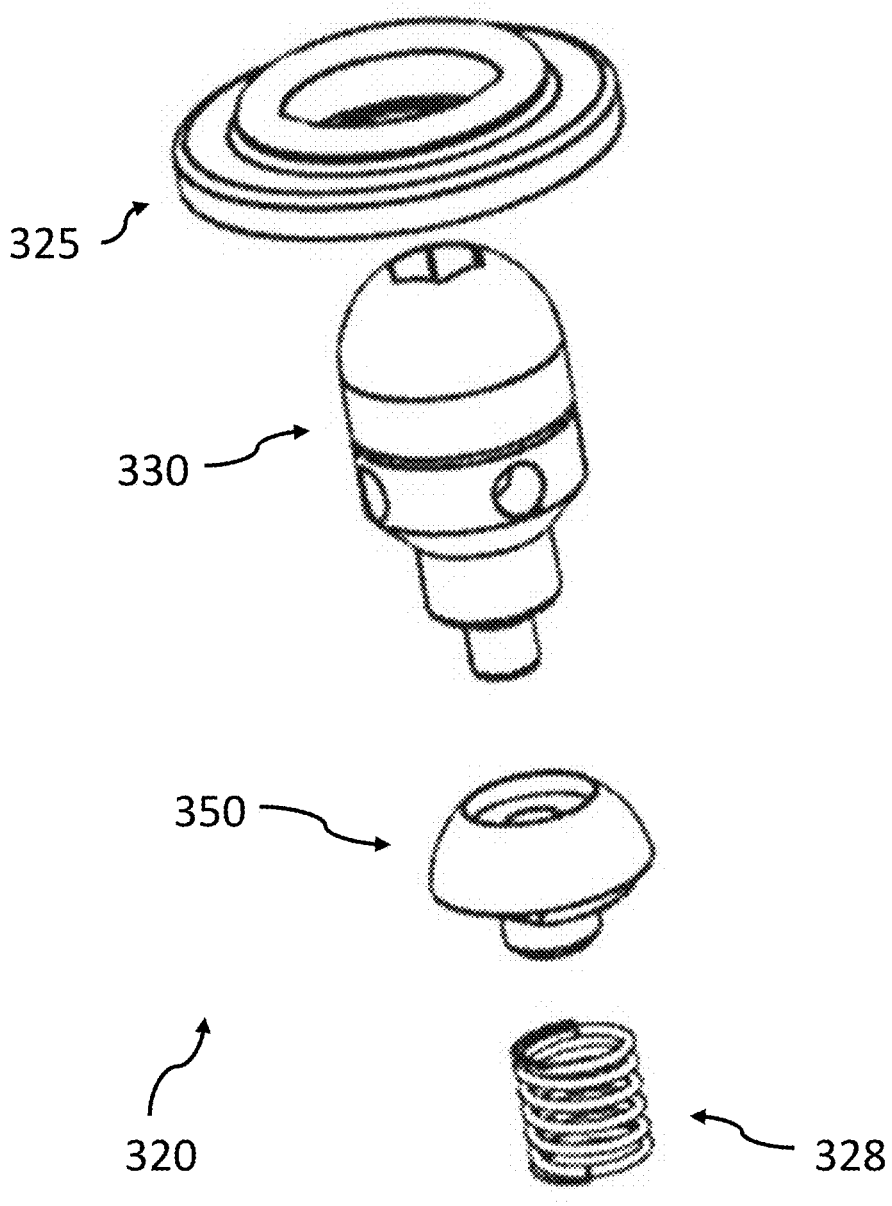
FIG. 12 is an exploded perspective view of a poppet assembly.

FIG. 12, the poppet assembly (320) has a poppet body one (330), a poppet body two (350), a diaphragm (325) and a spring (328).

Figure 13:
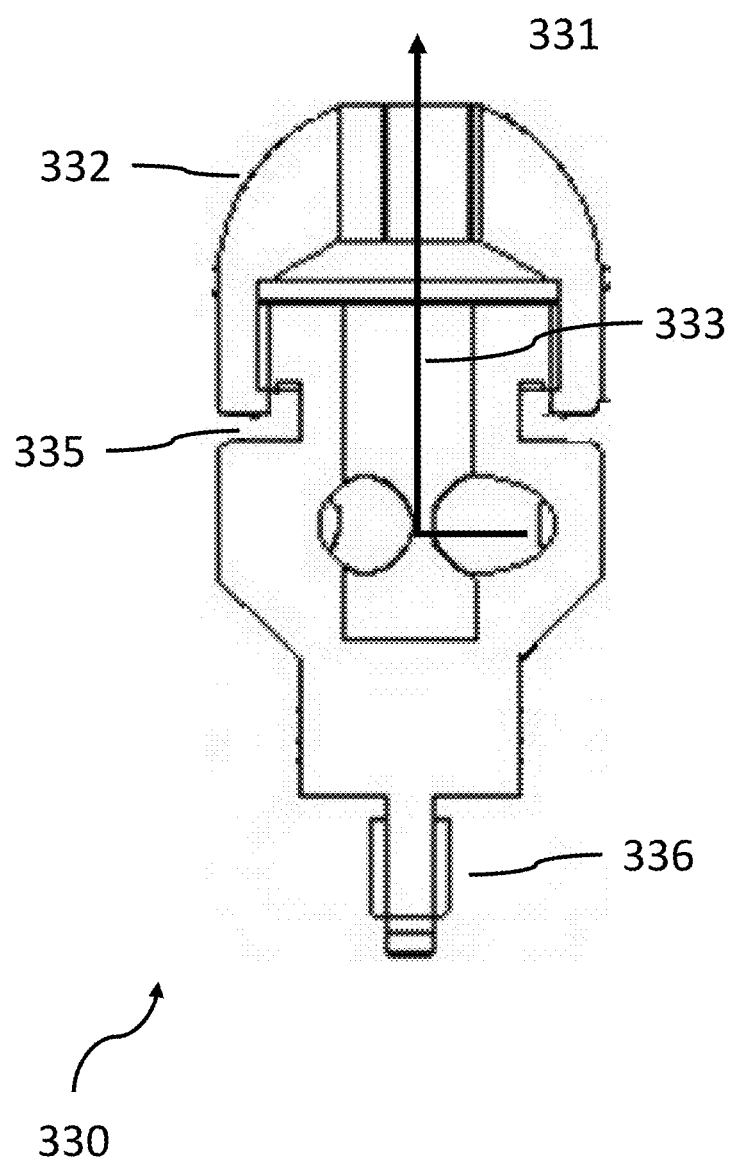
FIG. 13 is a sectional view of a poppet body one.

FIG. 13, the poppet body one (330) has an outer sealing surface (332) on an outside (331). There is a trapping provision (335), and a first joining interface (336). Marked by an arrow is an exhaust flow path (333) on an inside of the poppet body one (330).

Figures 14A, 14B:
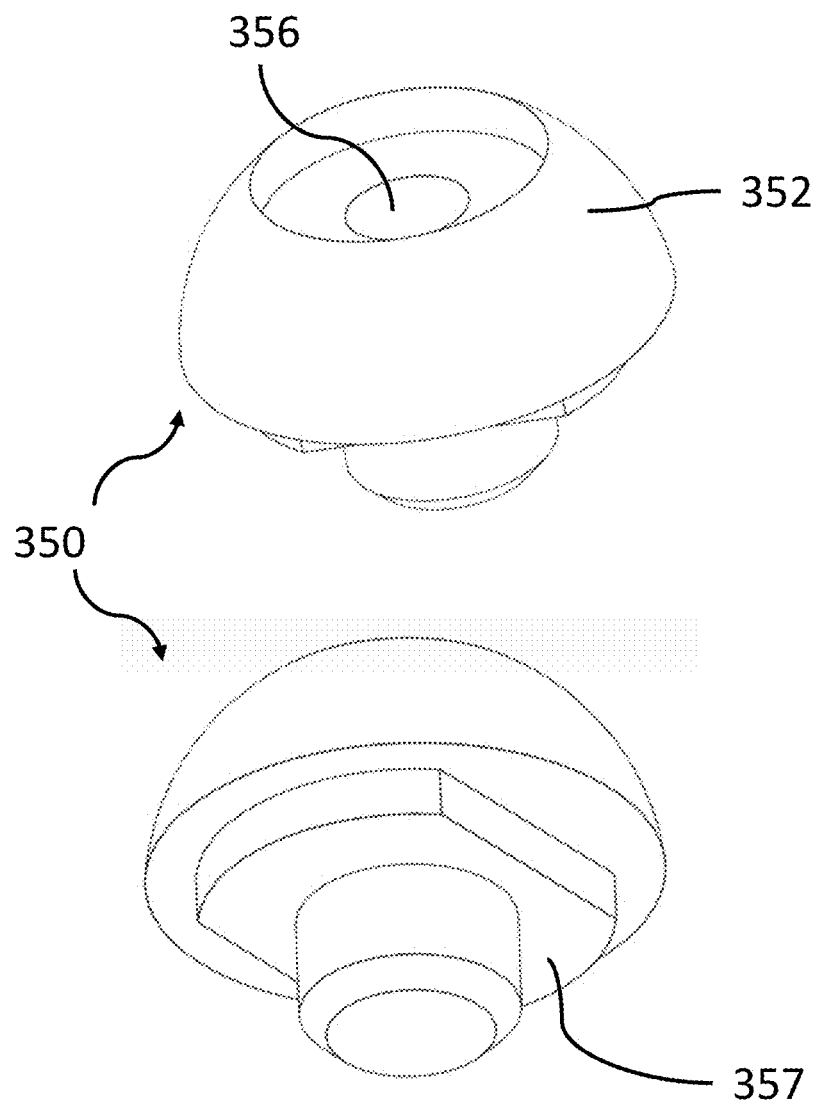
FIGS. 14A and 14B are perspective views of a poppet body two.

FIG. 14A, 14B, the poppet body two (350) has an inner sealing surface (352), a second joining interface two (356) and a fitment aid (357).

Figure 15:
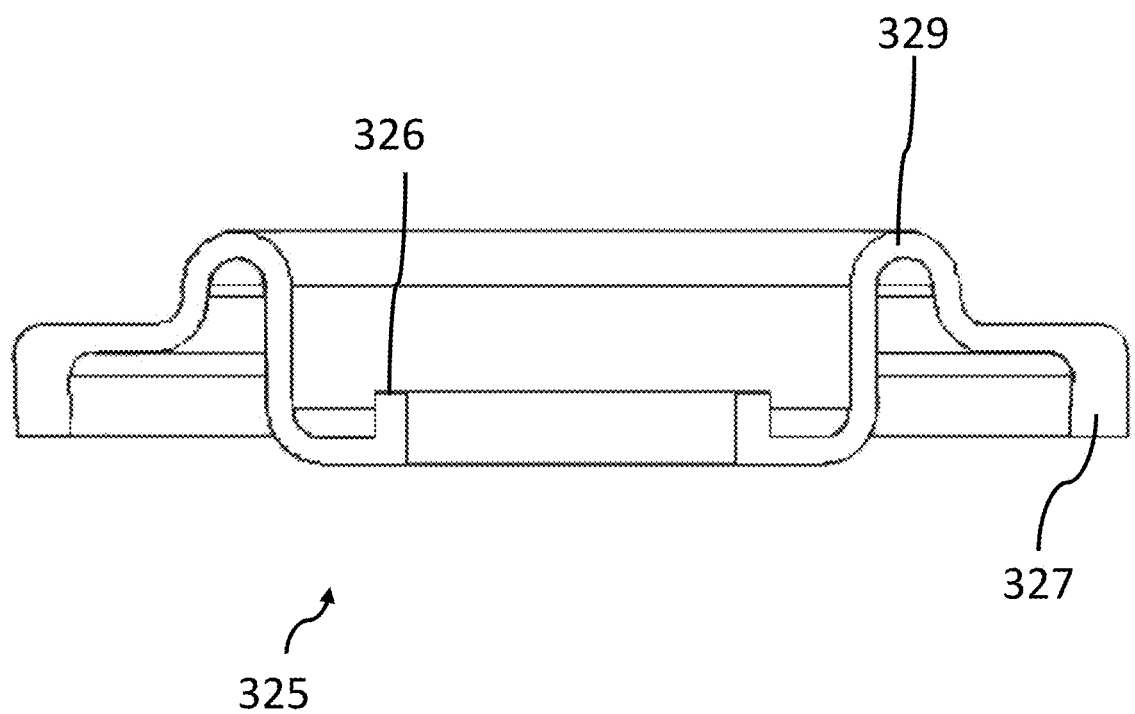
FIG. 15 is a sectional view of a diaphragm.

FIG. 15, the diaphragm (325) is a flexible disc made of a fluid compatible thermoplastic or elastomer, a bulge (329), has an inner flange (326) and an outer flange (327). The bulge (329) spreads (323) or aggregates (324) as the twin poppet assembly tilts, as can be seen in a boxed area of FIG. 2A, magnified in FIG. 2B.

The poppet body one (330) with the inner flange (326) of the diaphragm (325) trapped in the trapping provision (335) is disposed in the guide chamber (301) from its first opening (318) such that the outer flange (327) of the diaphragm (325) surrounds the support ring (319), while the poppet body two (350) is disposed in the guide chamber (301) from its second opening (318) such that the first joining interface (336) and the second joining interface (356) mutually engage firmly, thus creating the poppet valve assembly (150).

A swivel stroke length (102), shown in FIG. 2, of the swivel assembly (110), which implies an orthogonal travel between extreme positions, that ensures a required gap between the first sealing surface (241) of the firm cap (240) and the second sealing surface (261) of the ratcheted valve cap (260) with the outer sealing surface (332) of the poppet body one (330) of respective poppet assembly (320) is adjustable by the engager (281) engaging with the tooth periphery (263) of the ratcheted valve cap (260) at an appropriate tooth, arrived by rotatably adjusting the ratcheted cap valve (260). An axial thrust provided by the spring (270) prevents unwanted movement of the ratcheted cap (260).

Figure 16:
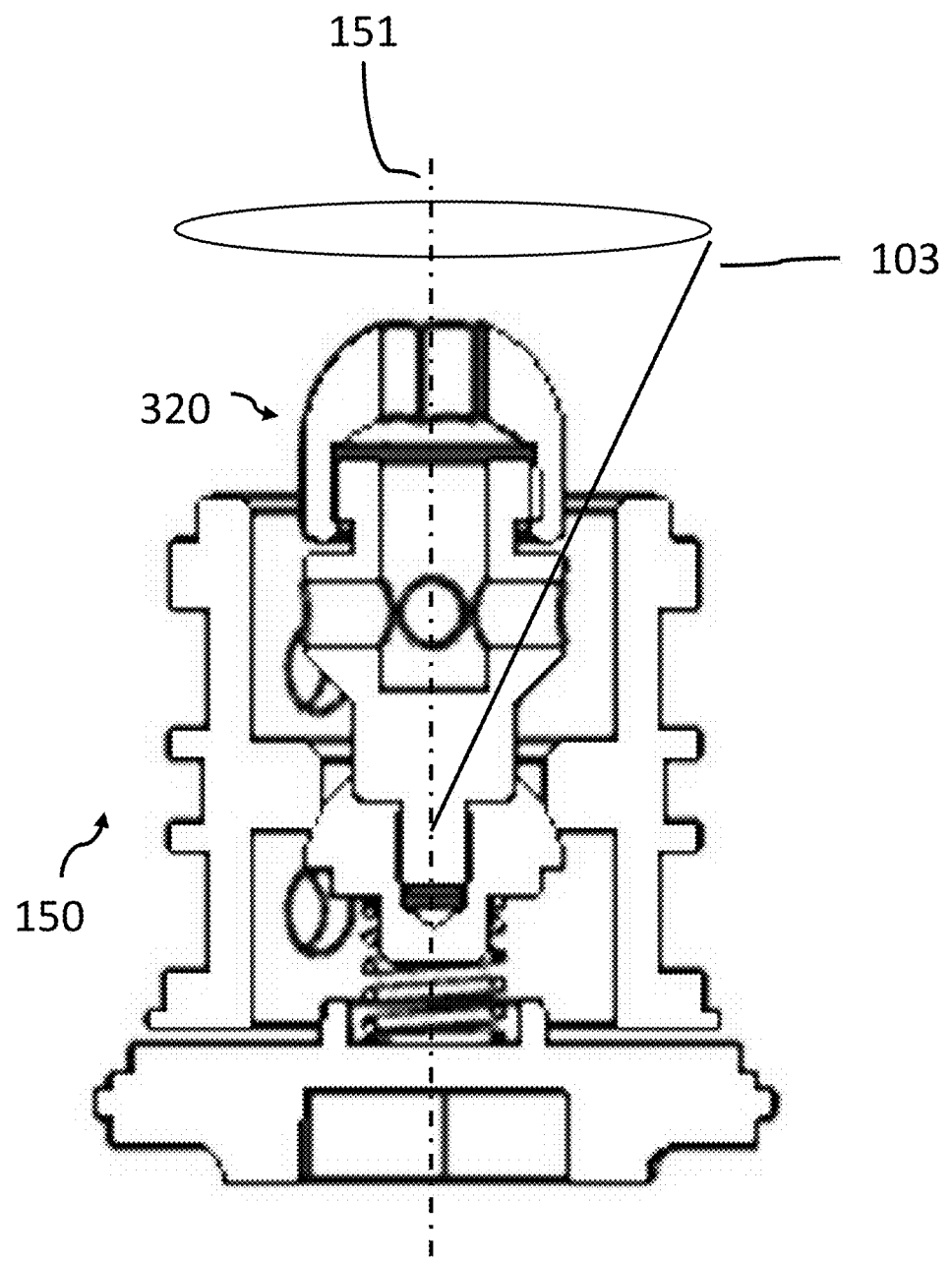
FIG. 16 is a sectional view of the poppet valve assembly illustrating a tilting degree of freedom.

FIG. 16, the poppet assembly (320) of the poppet valve assembly (150) has a conical tilting freedom (103) around its axis of assembly (151).

Figure 17:
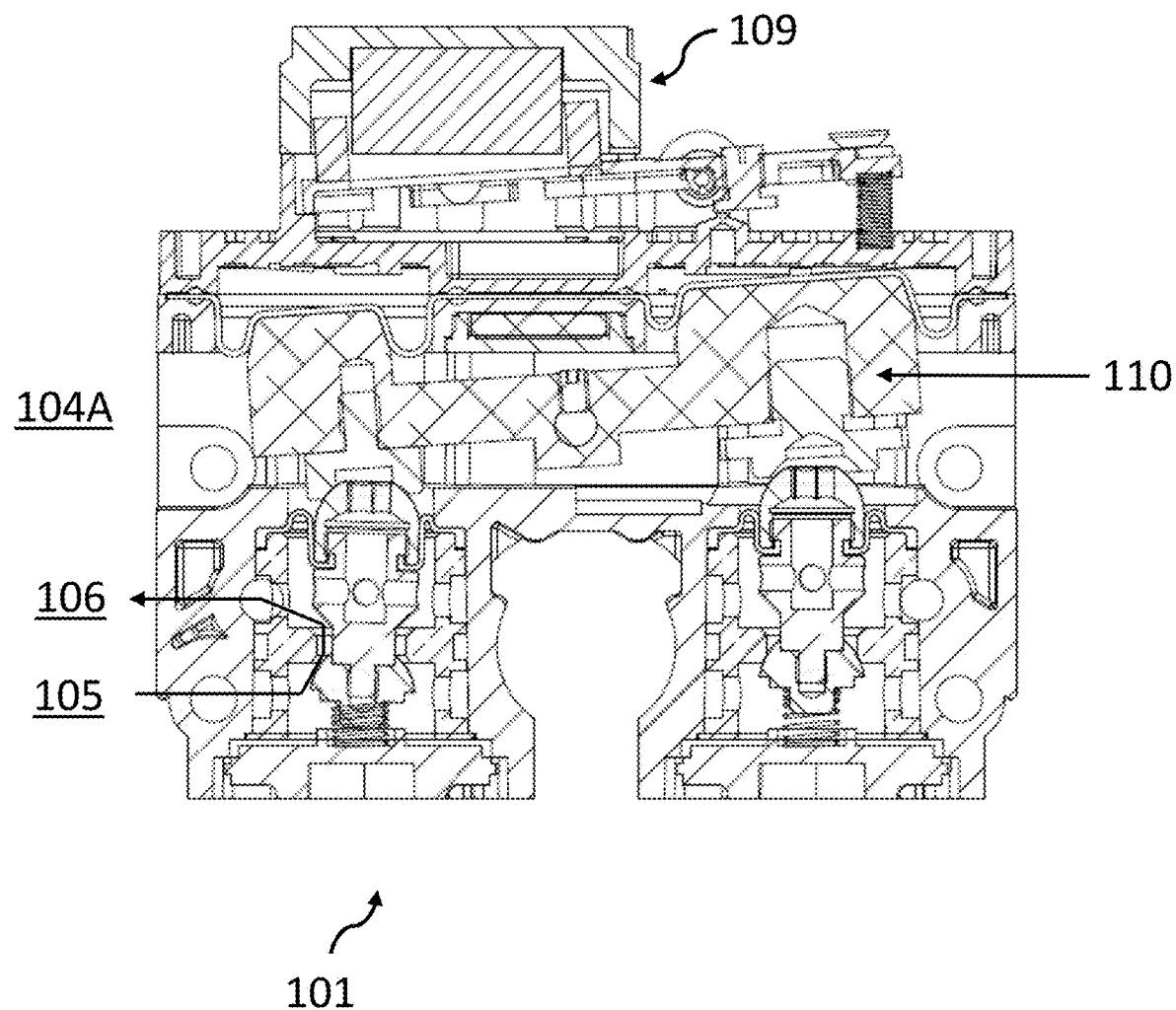
FIGS. 17, 18 and 19 are sectional front views of the positioner in different stable states.

In the preferred embodiment of the positioner, the twin poppet mechanism as per present invention occupies three stable states as shown in FIG. 17, 18, 19, as governed by a pre-stage valve (109) of the positioner (101).

FIG. 17, in a first stable state, the swivel assembly (110) tilts towards a first side (104A) of the positioner such that the first sealing surface (241) of the firm cap (240) presses against the outer sealing surface (332) of the poppet body one (330), of the poppet valve assembly (150) beneath it. Since the poppet assembly (150) has the tilting freedom (103), the first sealing surface (241) causes a rubbing or a lapping action on the outer sealing surface (332) while the swivel assembly (110) tilts. The lapping action also simultaneously happens between the inner sealing surface (352) of the poppet body two (350) and the chamber sealing surface (316) of the guide chamber (301). In this first stable state, an inlet port (105) and an outlet port (106) are connected while the exhaust flow path (333) is blocked. A reverse lapping action happens when the pre-state valve (109) governs release from the first stable state.

Figure 18:
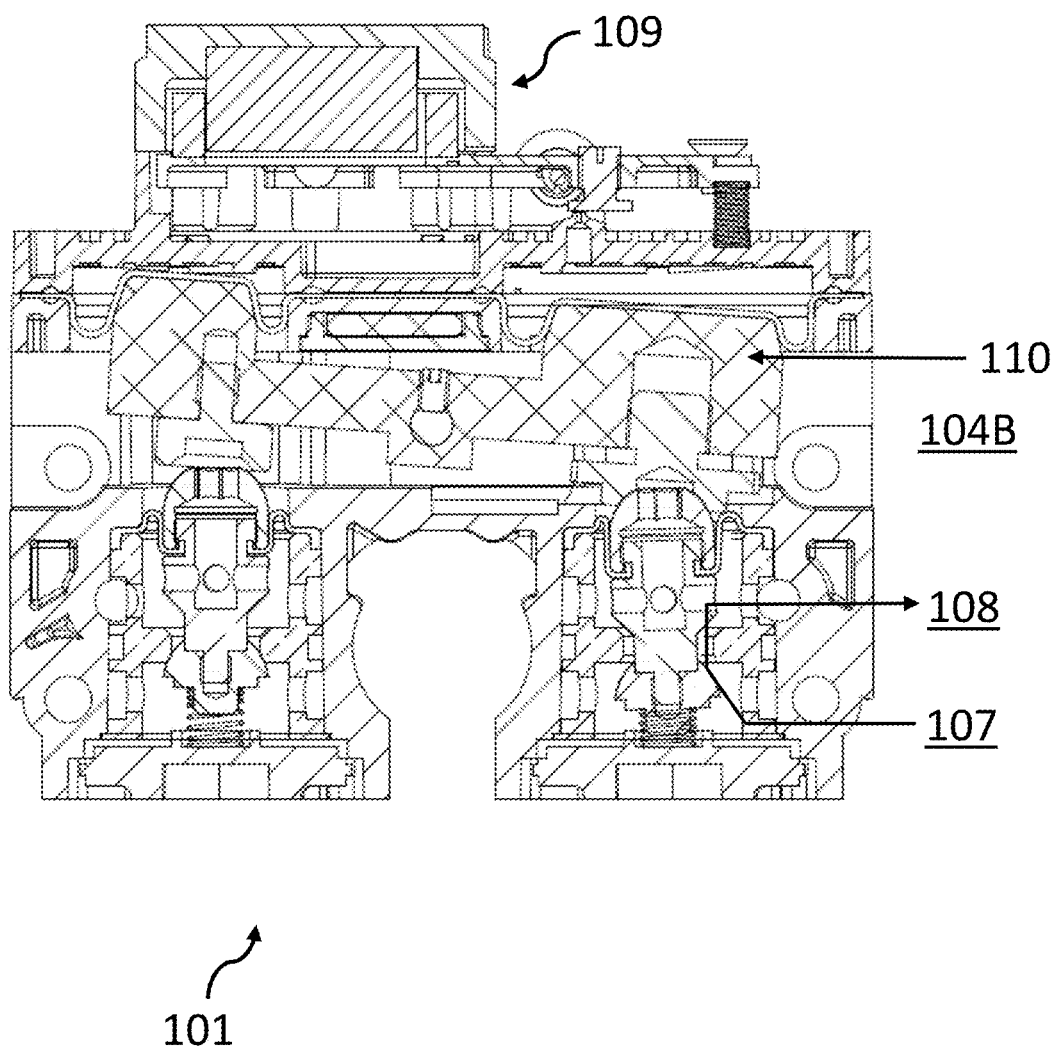

FIG. 18, in a second stable state, the swivel assembly (110) tilts towards a second side (104B) of the positioner such that the second sealing surface (261) of the ratcheted valve cap (260) presses against the outer sealing surface (332) of the poppet body one (330) of the poppet valve assembly (150) beneath it. Since the poppet assembly (150) has the tilting freedom (103), the second sealing surface (261) causes a rubbing or a lapping action on the outer sealing surface (332) while the swivel assembly (110) tilts. The lapping action also simultaneously happens between the inner sealing surface (352) of the poppet body two (350) and the chamber sealing surface (316) of the guide chamber (301). In this second stable state, an inlet port (107) and an outlet port (108) are connected while the exhaust flow path (333) is blocked. A reverse lapping action happens when the pre-state valve (109) governs release from the second stable state.

Figure 19:
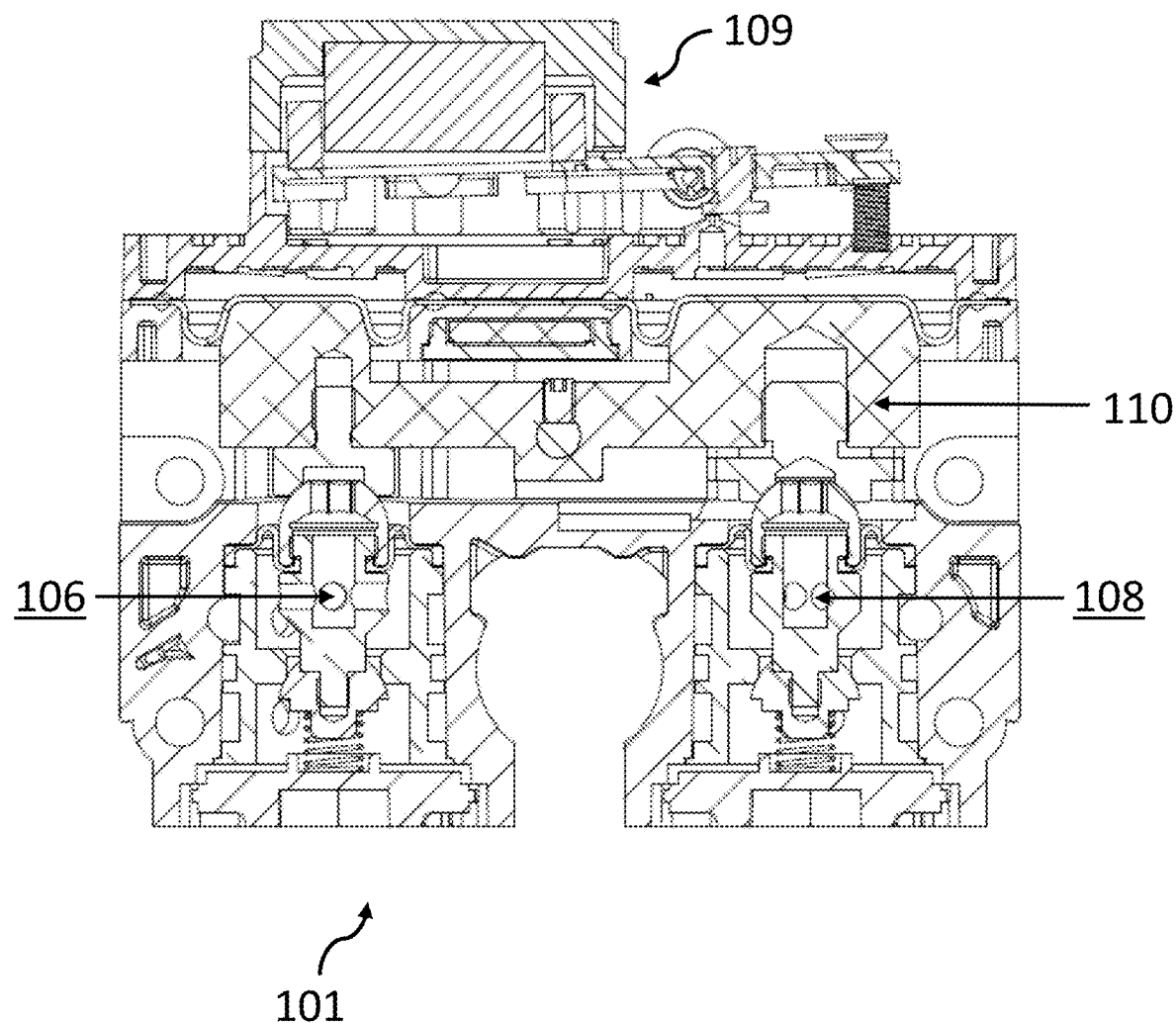

FIG. 19, in the middle stable state, the inlet ports (105, 107) and outlet ports (106, 108) remain disconnected while the exhaust flow path (333) of the respective poppet valve assemblies (150) gets connected to the corresponding outlet ports (106, 108).

Figure 20:
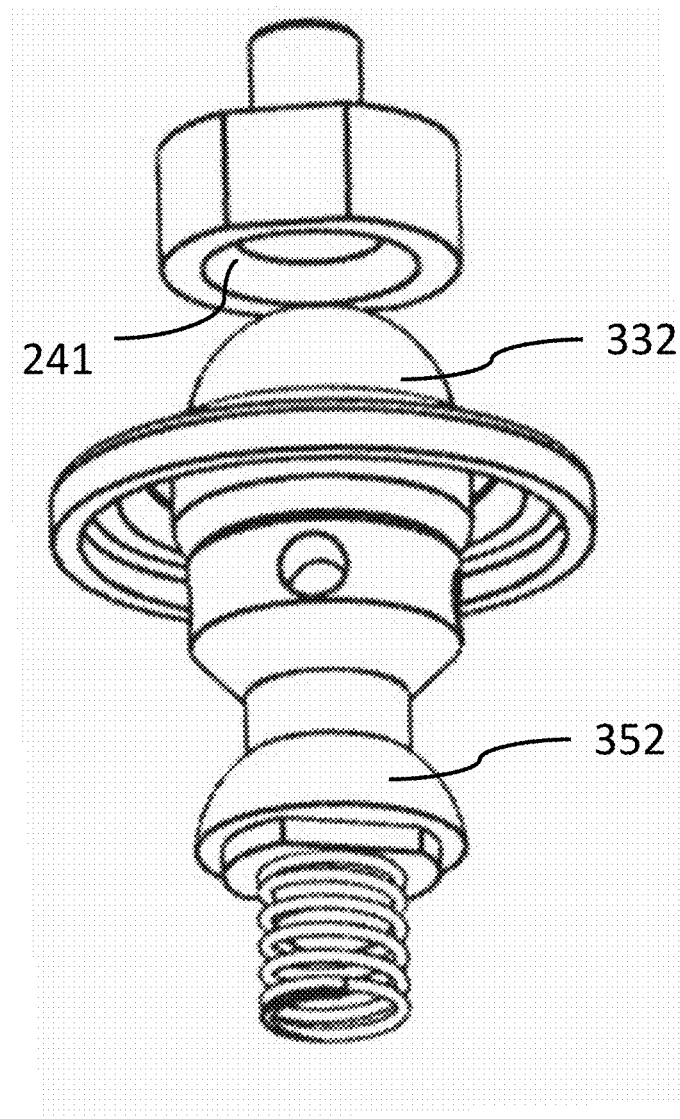
FIGS. 20 and 21 are perspective views of the poppet assembly specifically showing lapping surfaces.
Figure 21:
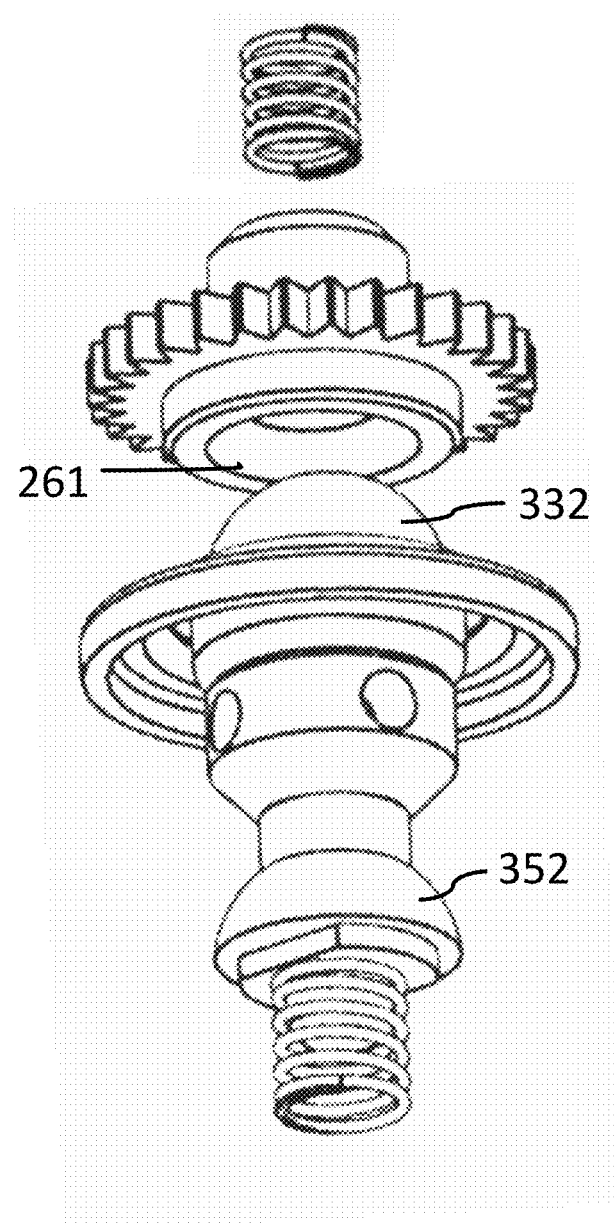

FIGS. 20 and 21 show a mating lapping surfaces more clearly.

Each lapping action may result into micro particles detached from the corresponding sealing surface. Such particles are carried away and out of the poppet valve assembly (150) through the exhaust flow path (333) by a blowout current consequent to valve operations.

Figure 22:
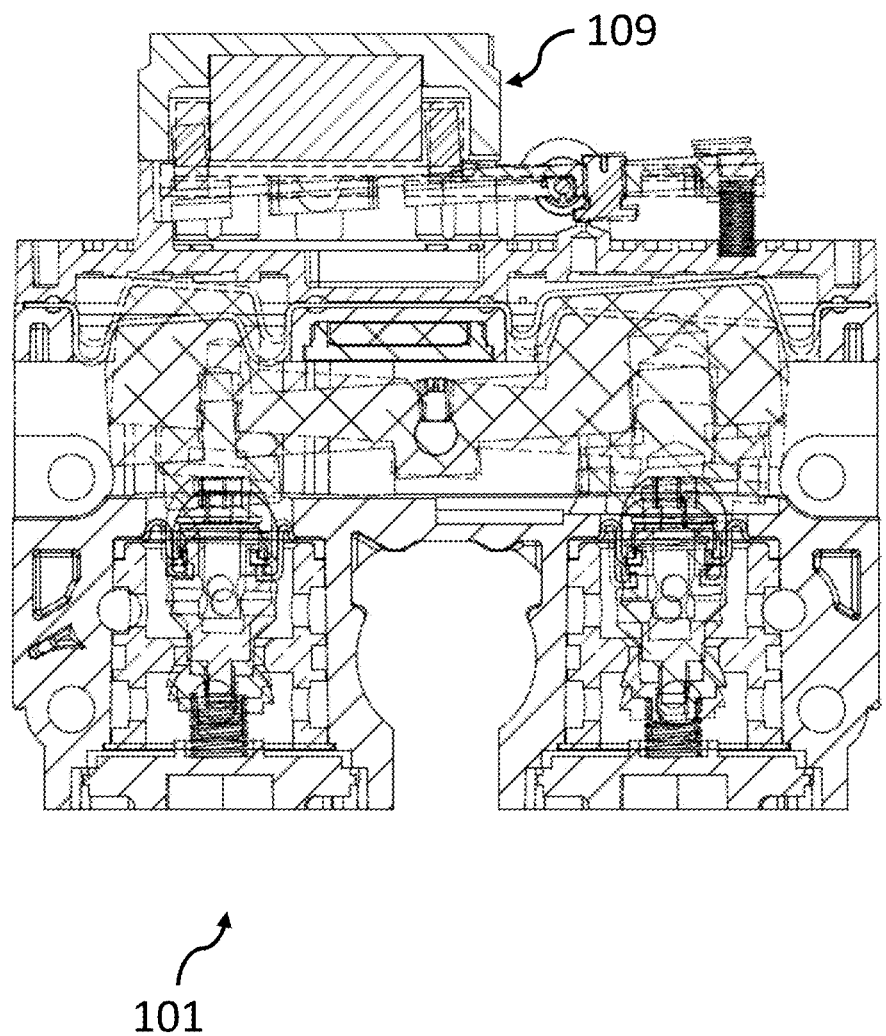
FIG. 22 is a sectional front view of the positioner showing all three stable states.

FIG. 22, the essence and the inventiveness of the present invention of the twin mechanism is a recurring "lapping—stable state—blow out" action during operation of the valves wherein each operation causes lapping action, consequently improving mutual sealings, namely mutual sealing between the first sealing surface (241) and the outer sealing surface (332), between the second sealing surface (261) and the outer sealing surface (332), between the inner sealing surfaces (352) and the corresponding chamber sealing surface (316), and thus progressively reducing fluid leakage.

The preferred embodiment is described in relation to a pair of poppet valves and in conjunction with a swiveling operation; however, the present invention is equally applyable to a single poppet valve or multiple poppet valves.

Poppet valve body may be made in two parts for ease of production and trapping of diaphragm.

I claim:

1. A twin poppet mechanism (100) of a valve positioner (101), comprising a poppet valve assembly (150) having an inlet port, an outlet port and an exhaust port, characterized in that the twin valve assembly (100) comprises: a swivel assembly (110) further comprising a swivel bridge (200) having a hinging passage (201), a first cap mounting provision (203) a second cap mounting provision (204), a firm valve cap (240), a ratcheted valve cap (260), a locking means (280) and a holding provision (202); the cap (240) having a first sealing surface (241) and a cap fixation provision (242); the ratcheted valve cap (260) having a second sealing surface (261), a ratchet fixation provision (262), and a toothed periphery (263); a spring (270); and the locking means (280) comprising an engager (281) having a defeat provision (282) and is spring assisted; a pair of poppet valve assembly (150), each poppet valve assembly (150) further comprising a guide chamber assembly (300) having a guide chamber (301) with a chamber sealing surface (316); and a poppet assembly (320) has a poppet body one (330), a poppet body two (350), a diaphragm (325) and a spring (328); wherein the firm cap (240) is rigidly disposed in the first cap mounting provision (203), while the ratchet cap (260) under an axial trust by the spring (270) is rotatably disposed in the second cap mounting provision (204), the poppet assembly (320) of the poppet valve assembly (150) has a conical tilting freedom (103) around its axis of assembly (151); wherein the twin poppet mechanism (100) has a first stable state, a second stable state, and a middle stable state as governed by a pre-stage valve (109) of the positioner (101); and wherein in the first stable state, the swivel assembly (110) tilts towards a first side (104A) of the positioner such that the first sealing surface (241) of the firm cap (240) presses against an outer sealing surface (332) of the poppet body one (330), of the poppet valve assembly (150) beneath it, a lapping action is caused between the first sealing surface (241) and the outer sealing surface (332), and between an inner sealing surface (352) of the poppet body two (350) and the chamber sealing surface (316) of the guide chamber (301), a reverse lapping action happens when the pre-state valve (109) governs a release from the first stable state, in a second stable state, the swivel assembly (110) tilts towards a second side (104B) of the positioner such that the second sealing surface (261) of the ratcheted valve cap (260) presses against the outer sealing surface (332) of the poppet body one (330) of the poppet valve assembly (150) beneath it, a lapping action is caused between the second sealing surface (261) and the outer sealing surface (332), and between the inner sealing surface (352) of the poppet body two (350) and the chamber sealing surface (316) of the guide chamber (301), a reverse lapping action happens when the pre-state valve (109) governs a release from the second stable state.

2. The twin poppet mechanism (100) as claimed in claim 1, wherein the poppet valve assembly (150) further comprises: the guide chamber (301) having a cylindrical wall (309), a support ring (319), a plurality of guide rings (310), at least one stopper ring (3 1 I), at least a 'O' ring groove (312) on an outside (313), on an inside (314), a blocking ring (315) having the chamber sealing surface (316), a first opening (317) and a second opening (318), and a plurality of first port openings (302) along with a corresponding first port flow path (303), and a plurality of second port openings (304) along with a corresponding second port flow path (305), on and around the cylindrical wall (309); the poppet assembly (320) having the poppet body one (330) with the outer sealing surface (332) on an outside (331), a trapping provision (335), and a first joining interface (336), and an exhaust flow path (333) on an inside of the poppet body one (330); the poppet body two (350) having has an inner sealing surface (352), a second joining interface two (356), and a fitment aid (357); a diaphragm (325) made of a fluid compatible thermoplastic or elastomer, having a bulge (329), an inner flange (326) and an outer flange (327), and a spring (328); wherein the poppet body one (330) with the inner flange (326) of the diaphragm (325) trapped in the trapping provision (335) is disposed in the guide chamber (301) from its first opening (317) such that the outer flange (327) of the diaphragm (325) surrounds the support ring (319), while the poppet body two (350) is disposed in the guide chamber (301) from its second opening (318) such that the first joining interface (336) and the second joining interface (356) mutually engage firmly; and wherein the poppet assembly (320) of the poppet valve assembly (150) has a conical tilting freedom (103) around its axis of assembly (151), the bulge (329) of the diaphragm (325) spreads (323) or aggregates (324) as the poppet assembly tilts (320).

3. The twin poppet mechanism (100) as claimed in claim 1, wherein the swivel assembly (110) has a swivel stroke length (102) that ensures a required gap between the first sealing surface (241) of the firm cap (240) and the second sealing surface (261) of the ratcheted valve cap (260) with the outer sealing surface (332) of the poppet body one (330) of respective poppet assembly (320) is adjustable by the engager (281) engaging with the tooth periphery (263) of the ratcheted valve cap (260) at an appropriate tooth, arrived by rotatably adjusting the ratcheted cap valve (260).

4. The twin poppet mechanism (100) as claimed in claim 1, wherein the first sealing surface (241), the second sealing surface (261), the outer sealing surfaces (332), the inner sealing surfaces (352), the chamber sealing surface (316) having any micro particles detached due to each lapping action are cleared of such micro particles from the poppet valve assembly (150) through the exhaust flow path (333) by a blowout current consequent to valve operations.

5. The twin poppet mechanism (100) as claimed in claim 1, wherein the first sealing surface (241) and the outer sealing surface, the second sealing surface (261) and the outer sealing surfaces (332), the inner sealing surface (352) and the chamber sealing surface (316) have a respective mutual sealing, a recurring lapping—stable state—blowout action during operation of the poppet valve assembly (150) progressively improving each mutual sealing.

6. The twin poppet mechanism (100) as claimed in claim 1, wherein the first stable state is a first inlet port (105) and a first outlet port (106) connected while the exhaust flow path (333) is blocked, the second stable state is a second inlet port (107) and a second outlet port (108) connected while the exhaust flow path (333) is blocked, the middle stable state is the first and second inlet ports (105, 107) and first and second outlet ports (106, 108) remain disconnected while the exhaust flow path (333) of the respective poppet valve assemblies (150) connected to the corresponding outlet ports (106, 108).

\* \* \* \* \*